(12) United States Patent
Phipps et al.

(10) Patent No.: US 9,684,410 B2
(45) Date of Patent: *Jun. 20, 2017

(54) TOUCH SENSITIVE SURFACE WITH RECESSED SURFACE FEATURE FOR AN ELECTRONIC DEVICE

(71) Applicant: Google Technology Holdings LLC, Mountain View, CA (US)

(72) Inventors: Chad Austin Phipps, Scottsdale, AZ (US); Jeffrey R. DeVries, Chicago, IL (US); John C. Johnson, Spring Grove, IL (US); Louis J. Lundell, Buffalo Grove, IL (US); Thomas Y. Merrell, Beach Park, IL (US); Mitul R. Patel, Lake Zurich, IL (US); Jiri Slaby, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,941

(22) Filed: Jun. 22, 2016

(65) Prior Publication Data
US 2016/0299634 A1 Oct. 13, 2016

Related U.S. Application Data

(63) Continuation of application No. 13/827,735, filed on Mar. 14, 2013, now Pat. No. 9,400,525.

(51) Int. Cl.
*G06F 3/044* (2006.01)
*G06F 3/041* (2006.01)
(Continued)

(52) U.S. Cl.
CPC ............ *G06F 3/0418* (2013.01); *G06F 1/169* (2013.01); *G06F 1/1656* (2013.01); *G06F 3/017* (2013.01);
(Continued)

(58) Field of Classification Search
CPC ...................................................... G06F 3/041
See application file for complete search history.

(56) References Cited

U.S. PATENT DOCUMENTS 5,355,148 A 10/1994 Anderson
5,729,219 A 3/1998 Armstrong et al.
(Continued)

FOREIGN PATENT DOCUMENTS

| EP | 2416338 A1 | 2/2012 |
| KR | 10-2008-0100602 A | 11/2008 |
| WO | 2014/143461 A1 | 9/2014 |

OTHER PUBLICATIONS

International Search Report for PCT Patent Application No. PCT/US2014/015219, mailed on Apr. 8, 2014, 3 pages.
(Continued)

*Primary Examiner* — Alexander Eisen
*Assistant Examiner* — Cory Almeida
(74) *Attorney, Agent, or Firm* — Shumaker & Sieffert, P.A.

(57) ABSTRACT

An electronic device (300) includes a housing (301). A touch sensitive surface (100) can be disposed along the housing. The touch sensitive surface can include a recessed surface feature (106) on a portion of the touch sensitive surface. A control circuit (315), operable with the touch sensitive surface, can detect a predetermined gesture sequence (501, 502, 503) when a touch actuation along the touch sensitive surface interacts with the recessed surface feature.

20 Claims, 7 Drawing Sheets

(51) Int. Cl.
*G06F 3/0354* (2013.01)
*G06F 1/16* (2006.01)
*G06F 3/01* (2006.01)

(52) U.S. Cl.
CPC .......... *G06F 3/03547* (2013.01); *G06F 3/044* (2013.01); *G06F 3/0412* (2013.01); *G06F 2203/04107* (2013.01)

(56) References Cited

U.S. PATENT DOCUMENTS

| | | |
|---|---|---|
| 7,046,230 B2 | 5/2006 | Zadesky et al. |
| 7,800,592 B2 | 9/2010 | Kerr et al. |
| 8,049,731 B2 | 11/2011 | Baker et al. |
| 2003/0043174 A1* | 3/2003 | Hinckley ............ G06F 3/03547 345/684 |
| 2004/0056837 A1* | 3/2004 | Koga ........................ G06F 1/16 345/156 |
| 2008/0204418 A1* | 8/2008 | Cybart .................. G06F 1/1626 345/173 |
| 2009/0103250 A1* | 4/2009 | Takashima ............... H05K 9/00 361/679.02 |
| 2014/0267136 A1 | 9/2014 | Phipps et al. |

OTHER PUBLICATIONS

Prosecution History from U.S. Appl. No. 13/827,735 from Nov. 3, 2014 through Mar. 23, 2016 90 pgs.

* cited by examiner

TOUCH SENSITIVE SURFACE WITH RECESSED SURFACE FEATURE FOR AN ELECTRONIC DEVICE

This application is a Continuation of application Ser. No. 13/827,735, filed on Mar. 14, 2013, the entire content of which is hereby incorporated by reference.

TECHNICAL FIELD

This disclosure relates generally to electronic devices, and more particularly to user input elements for electronic devices.

BACKGROUND ART

"Intelligent" portable electronic devices, such as smart phones, tablet computers, and the like, are becoming increasingly powerful computational tools. Moreover, these devices are becoming more prevalent in today's society. For example, not too long ago a mobile telephone was a simplistic device with a twelve-key keypad that only made telephone calls. Today, "smart" phones, tablet computers, personal digital assistants, and other portable electronic devices not only make telephone calls, but also manage address books, maintain calendars, play music and videos, display pictures, and surf the web.

As the capabilities of these electronic devices have progressed, so too have their user interfaces. Prior keypads having a limited number of keys have given way to sophisticated user input devices such as touch sensitive screens or touch sensitive pads. Touch sensitive systems, including touch sensitive displays, touch sensitive pads, and the like, include sensors for detecting the presence of an object such as a finger or stylus. By placing the object on the touch sensitive surface, the user can manipulate and control the electronic device without the need for a physical keypad.

One drawback to touch sensitive electronic devices is that some offer limited modes of inout. It would be advantageous to have an improved touch sensitive surface that offers additional modes of operation.

Figure 1:
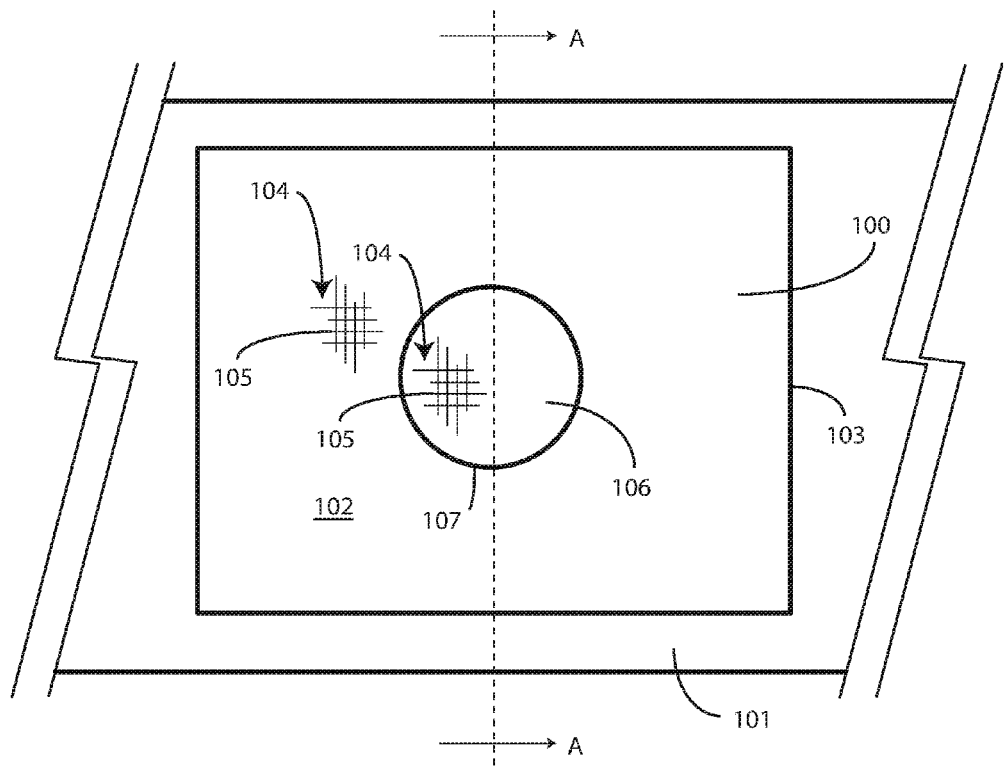
FIG. 1 illustrates a plan view of one explanatory touch sensitive surface configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

In accordance with one embodiment, a touch sensitive surface includes a recessed surface feature disposed along a portion of the touch sensitive surface. In one embodiment, the recessed surface feature includes a concave surface element relative to the areas of the touch sensitive surface that are complementary to the recessed surface feature, e.g., those portions of the touch sensitive surface extending beyond a perimeter of the element.

The touch sensitive surface may be disposed along a housing of an electronic device. For example, in one embodiment the touch sensitive surface is disposed along a rear major face of a device housing. This configuration permits the front major face of the device to accommodate a display. The user can control the device, and data presented on the display, by interfacing with the touch sensitive surface disposed on the backside of the device. Placing the touch sensitive surface on the rear of the device both provides for simpler user operation in one embodiment and leaves the entire front side of the device available for the display so that a finger does not need to occlude the touch sensitive display to interact with the images on the display.

A control circuit, which is operable with the touch sensitive surface, is configured to detect a predetermined gesture sequence along the touch sensitive display. In one or more embodiments, the predetermined gesture sequence occurs when a user's finger, stylus, or other object interacts with the recessed surface feature. For example, in one embodiment, a user's finger can begin within the perimeter of the recessed surface feature, and then traverse the perimeter of the recessed surface feature to terminate along portions of the touch sensitive surface that are complementary to the recessed surface feature. In another embodiment, the opposite can occur, i.e., a user's finger can begin outside the perimeter of the recessed surface feature, and then traverse the perimeter of the recessed surface feature to terminate within the perimeter of the recessed surface feature. In yet another embodiment, a predetermined gesture can begin and terminate along portions of the touch sensitive surface that are complementary to the recessed surface feature, but pass through the recessed surface feature while the gesture is occurring. In one or more embodiments, when a predetermined gesture is detected, the control circuit can execute an operation corresponding to the predetermined gesture to control the electronic device and/or data presented on the display. For example, the control circuit can increase or decrease a volume output of the electronic device, pan through data presented on a display of the electronic device, perform a zoom operation on the data presented on the display of the electronic device, deliver a haptic response, or combinations thereof.

In one embodiment, the touch sensitive surface includes a capacitive touchpad that spans the touch sensitive surface. While a capacitive touchpad is one technology suitable for use with the touch sensitive surface, those of ordinary skill in the art having the benefit of this disclosure will understand that other technologies can be used as well. For example, the touch sensitive surface can detect touch, in one or more embodiments, using a resistive touch sensor, a surface acoustic wave touch sensor, a surface capacitance sensor, a projected capacitance sensor, a mutual capacitance sensor, a self-capacitance sensor, an infrared grid sensor, an infrared acrylic projection sensor, an optical imaging sensor, a dispersive signal sensor, an acoustic pulse recognition sensor, and so forth.

In one embodiment, the capacitive touchpad includes a plurality of capacitive electrode pairs, with each pair defining a "pixel" of the capacitive touchpad. To assist in preventing false detection of predetermined gestures, in one embodiment to detect user interaction with the recessed surface feature of the touch sensitive surface, a user must interact with a minimum threshold of pixels spanning the recessed surface feature. Illustrating by example, if twenty-five pixels are disposed along the recessed surface feature, touch input may have to be received by, say, at least ten pixels for the control circuit to register an interaction with the recessed surface feature. Setting such a threshold helps to prevent accidental brushing or light touches occurring on only portions of the recessed surface feature from being detected as at least a portion of some predetermined gestures.

Figure 2:
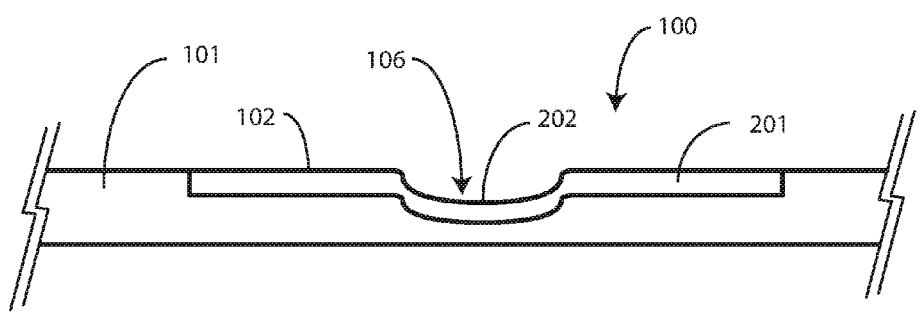
FIG. 2 illustrates a sectional view of one explanatory touch sensitive surface configured in accordance with one or more embodiments of the disclosure.

FIGS. 1 and 2 illustrate one explanatory touch sensitive surface 100 configured in accordance with one or more embodiments of the disclosure. FIG. 1 illustrates a plan view of the touch sensitive surface 100, while FIG. 2 illustrates a cross-sectional view. In this explanatory embodiment, the touch sensitive surface 100 is disposed along a housing 101 of an electronic device.

In one embodiment, the touch sensitive surface 100 defines an area configured with a touch sensor 201 to detect the presence of an object, such as a user's finger or stylus, when that object is proximally located with a surface 102 of the touch sensitive surface 100. The surface 102 can include a protective shield or other covering that protects the electronics of the touch sensor 201.

In one or more embodiments, the touch sensor 201 is a capacitive touchpad that spans the touch sensitive surface 100. The capacitive touchpad can be configured to detect movement of, for example, a user's finger, occurring within a region defined by, for example, the outer perimeter 103 of the touch sensitive surface. The capacitive touchpad can further be configured to detect a direction of the movement within the region.

Capacitive touchpads suitable for use with embodiments of the disclosure can be constructed in a variety of ways. For example, in one embodiment the capacitive touchpad is formed by horizontal conductors and vertical conductors that cross over each other to define a grid 104 of pixels 105. The conductors can be coupled to a touch driver, operable with the control circuit, which delivers a signal to each pixel of the grid. Electrical charges then travel to the pixels 105 of the grid. Electromagnetic fields are then created about the pixels 105. The fields are altered by a user's finger or other conductive object interacting with the touch sensitive surface 100. This alteration allows the control circuit to detect touch input.

Figure 4:
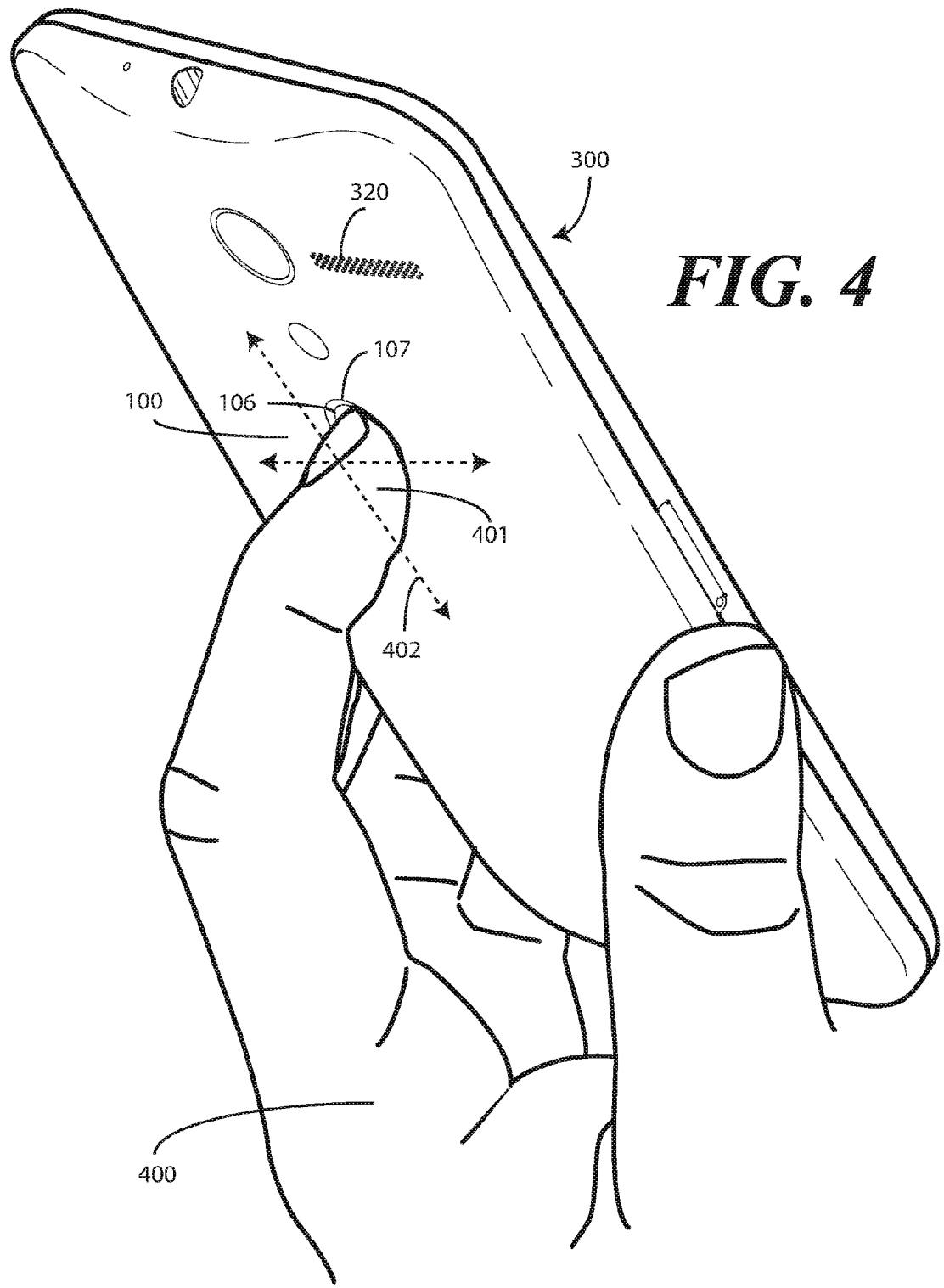
FIG. 4 illustrates a user manipulating an explanatory touch sensitive surface of an electronic device configured in accordance with one or more embodiments of the disclosure.

In one embodiment, the electrodes defining each pixel 105 can define a coordinate plane. Said differently, each pixel 105 can correspond to a different a particular geographic coordinate defined by the touch sensitive surface 100. By detecting a change in the capacitance of one or more pixels 105, the control circuit can thus determine an X and Y coordinate, and optionally the Z coordinate where the touch sensitive surface 100 is non-planar as shown in FIG. 4, at which the touch input occurs. This locational information can be used to control data on the display. Motion can be detected as well. Other forms of capacitive touchpads suitable for use with embodiments of the disclosure will be obvious to those of ordinary skill in the art having the benefit of this disclosure.

In one embodiment, the touch sensitive surface 100 includes a recessed surface feature 106 disposed along a portion of the touch sensitive surface 100. The recessed surface feature 106 is delineated by a perimeter 107. Portions of the touch sensitive surface 100 disposed within the perimeter constitute the recessed surface feature 106, while portions within the perimeter 103 of the touch sensitive surface 100 and outside the perimeter 107 of the recessed surface feature 106 constitute portions of the touch sensitive surface 100 that are complementary to the recessed surface feature 106.

As seen most clearly in FIG. 2 taken along cross-section A-A of FIG. 1, in this illustrative embodiment the recessed surface feature 106 has a concave surface element. Those of ordinary skill in the art having the benefit of this disclosure will understand that the recessed surface feature may take other forms. For example, in one embodiment the recessed surface feature can be planar, with a bottom floor 202 being substantially flat. In another embodiment, the recessed surface feature can even be convex while being recessed, with an apex of any convex shape being recessed from the touch sensitive surface 100. Moreover, the bottom floor 202 can even be textured and may include a plurality of convex and concave features as well.

Figure 3:
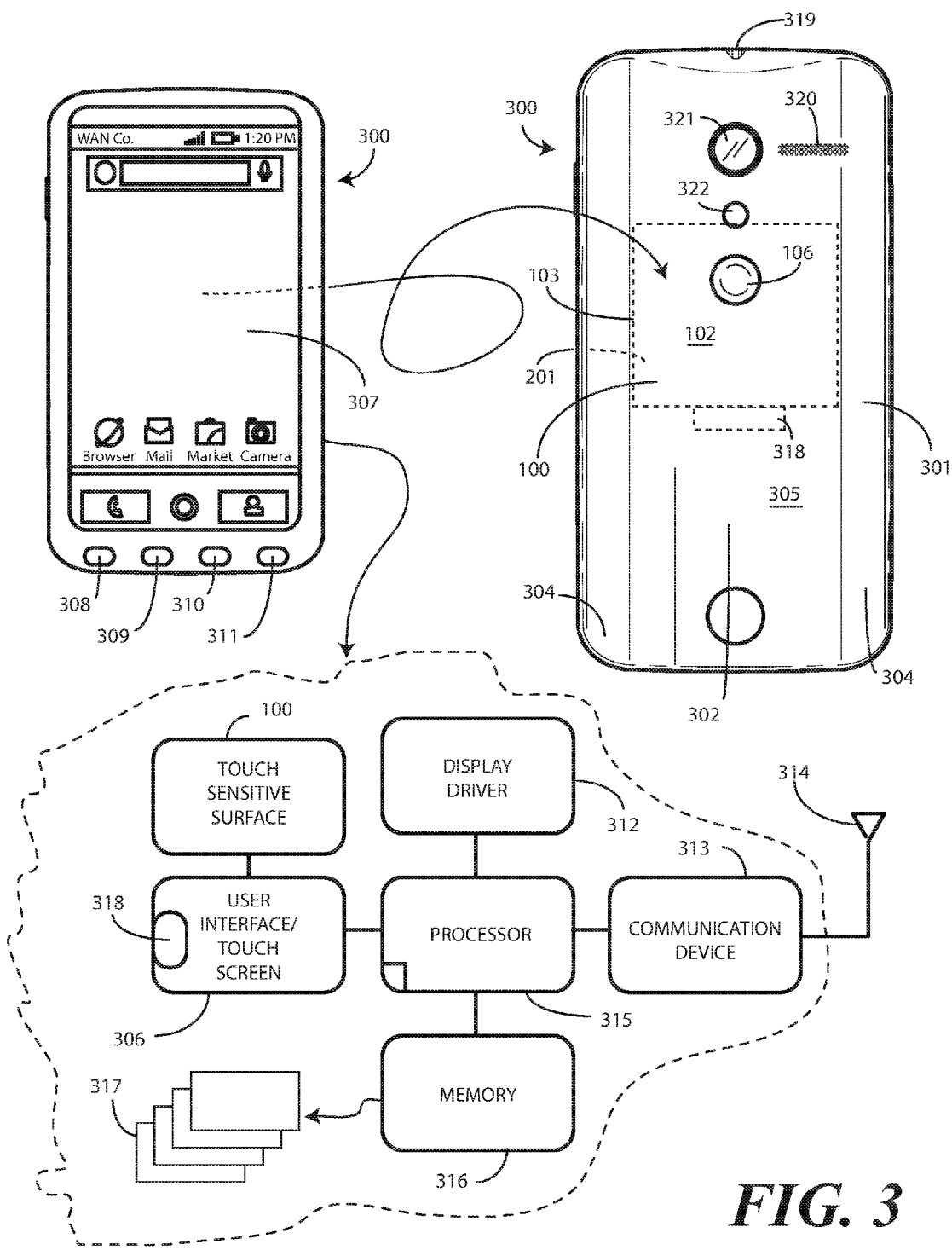
FIG. 3 illustrates one explanatory electronic device configured in accordance with one or more embodiments of the disclosure.

FIG. 3 illustrates an explanatory electronic device 300 configured in accordance with one or more embodiments of the disclosure. The explanatory electronic device 300 is shown as a smart phone for ease of illustration. However, it will be obvious to those of ordinary skill in the art having the benefit of this disclosure that other portable electronic devices may be substituted for the explanatory smart phone of FIG. 3. For example, the electronic device 300 may be configured as a palm-top computer, a tablet computer, a gaming device, wearable computer, a remote controller, a media player, laptop computer, portable computer, or other electronic device.

As shown in FIG. 3, the electronic device 300 includes a touch sensitive surface 100. In this illustrative embodiment, the touch sensitive surface 100 is simply a portion of the housing 301 beneath which a touch sensor 201 is disposed. Using a portion of the housing 301 to define the surface 102 of the touch sensitive surface 100 provides a streamlined look and feel that can be desirable to a consumer. The touch sensitive surface 100 includes a recessed surface feature 106 on a portion of the touch sensitive surface 100 as previously described.

Note that the housing 301 of FIG. 3 is convex in that a central portion 302 of the rear face 305 of the electronic device 300 extends outwardly from the electronic device 300, i.e., out of the page as viewed in FIG. 3, relative to the side portions 304 of the rear face 305. By contrast, the housing (101) of FIG. 1 was substantially planar. It should be noted that housings of electronic devices employing embodiments of the disclosure can take a variety of shapes, and can be substantially planar, convex, concave, undulating, or combinations thereof.

In this explanatory embodiment, the touch sensitive surface 100 is disposed along the rear face 305 of the electronic device. It should be noted that while the touch sensitive surface 100 of FIG. 3 is disposed on the rear face 305 to illustrate one or more of its advantages, such touch sensitive surfaces configured in accordance with embodiments of the disclosure can be disposed on any external surface of the electronic device.

In FIG. 3, the explanatory electronic device 300 is shown illustratively with a schematic block diagram. The illustrative electronic device 300 includes a user interface 306. The user interface 306 can include multiple elements, as is the case in this illustrative embodiment. Here, the user interface 306 includes a touch sensitive display 307, one or more buttons 308, 309, 310, 311, and the touch sensitive surface 100. In one or more embodiments, the user interface 306 can include additional elements, including an audio jack 319, a loudspeaker 320, a camera 321, a microphone 322, or a haptic component 318. In other embodiments, additional accessories can be included in the user interface 306, including an earpiece speaker, wirelessly coupled accessories, loudspeaker devices, and so forth.

The touch sensitive display 307 is operable with a display driver 312. The illustrative electronic device 300 also includes a communication circuit 313 that can be configured for wired or wireless communication with one or more other devices or networks. The networks can include a wide area network, a local area network, and/or personal area network. The communication circuit 313 can include wireless communication circuitry, one of a receiver, a transmitter, or transceiver, and one or more antennas 314.

The electronic device 300 includes a control circuit 315, which can include one or more processors. The control circuit 315 is responsible for performing the various functions of the electronic device 300. In one embodiment, the control circuit 315 is operable with the touch sensor 201 to detect touch actuation from an object. The control circuit 315 can be a microprocessor, a group of processing components, one or more Application Specific Integrated Circuits (ASICs), programmable logic, or other type of processing device. The control circuit 315 can be operable with the user interface 306 and the communication circuit 313, as well as various peripheral ports (not shown) that can be coupled to peripheral hardware devices via interface connections.

The control circuit 315 can be configured to process and execute executable software code to perform the various functions of the electronic device 300. A storage device, such as memory 316, stores the executable software code used by the control circuit 315 for device operation. The executable software code used by the control circuit 315 can be configured as one or more modules 317 that are operable with the control circuit 315. Such modules 317 can store instructions, control algorithms, and so forth. The instructions can instruct processors or control circuit 315 to perform the various steps, touch sensing, predetermined gesture detection, and corresponding methods described below.

As noted above, in one embodiment, the touch sensor 201 is configured as a capacitive touchpad configured to detect movement of a user's finger or other object within a region defined by the outer perimeter 103 of the capacitive touchpad. The capacitive touchpad can further be configured to detect a direction of the movement within the region.

In one or more embodiments, the touch sensitive surface 100 is operable with an optional haptic component 318. The haptic component 318 can be configured to provide a pseudo-tactile feedback in response to user actuation sensed as a predetermined gesture along the touch sensitive surface 100. In one embodiment, the haptic component 318 can simulate the popples or spring mechanisms of conventional keys by delivering a tactile response to housing 301 of the electronic device 300 when the device senses a predetermined gesture on the touch sensitive surface 100.

In one embodiment of a haptic component 318, a haptic layer includes a transducer configured to provide a sensory feedback when a user delivers a predetermined gesture to the touch sensitive surface 100. In one embodiment, the transducer is a piezoelectric transducer configured to apply a mechanical "pop" to the housing 301 of the electronic device 300 that is strong enough to be detected by the user. Thus, the tactile feedback layer of a haptic component 318 provides sensory feedback to the user, thereby indicating when a predetermined gesture is detected by the control circuit 315. As an alternative to including a haptic device, acoustic feedback could be provided via speakers. Visible feedback could also be provided either directly from the touch sensitive display 307, or by integrating light emitting diodes, optionally with light guides, along surfaces of the electronic device 300. In another embodiment, electrostatic vibration technology may also be used on the surface top to provide haptic feedback in response to user gestures, such as swiping.

In one or more embodiments, the control circuit 315 is configured to detect a predetermined gesture sequence when a user applies touch actuation along the touch sensitive surface 100 and interacts with the recessed surface feature 106. In one embodiment, where the touch sensor 201 includes a capacitive touch sensor having capacitive electrode pairs defining pixels (105) spanning the recessed surface feature 106, the control circuit 315 can be configured to detect the predetermined gesture sequence only when the applied touch interaction interacts with a predetermined subset of the capacitor electrode pairs or pixels. For example, in one embodiment about twenty-five pixels span the surface of the recessed surface feature 106. The control circuit 315 can be configured, for example, to detect interaction with the recessed surface feature 106 when a sufficient number of pixels have sensed the touch input. One example of a number of pixels defining this predetermined subset is about ten pixels. Requiring that at least a predetermined subset of the pixels detect the touch input helps to prevent the detection of false recessed surface feature interaction when a user inadvertently contacts a small portion of the recessed surface feature 106.

Turning briefly to FIG. 4, a user 400 is shown initiating a predetermined gesture sequence by placing a finger 401 into the recessed surface feature 106. The user 400 can then move 402 the finger 401 out of the recessed surface feature 106 to traverse the perimeter 107 of the recessed surface feature 106 to finish along the touch sensitive surface 100 at a location outside the perimeter 107 of the recessed surface feature 106. In one embodiment, the control circuit (315) is configured to recognize this "beginning inside the recessed surface feature and finishing outside the recessed surface feature" as a predetermined gesture sequence. Other examples of predetermined gesture sequences will be described in more detail below with reference to FIG. 5.

Upon detecting the predetermined gesture sequence, the control circuit (315) can perform an operation. One example of such an operation is increasing or decreasing a volume output of a speaker 320 of the electronic device 300. Other operations include panning through data presented on a display of the electronic device 300, performing a zoom operation on the data presented on the display of the electronic device 300, delivering a haptic response with the haptic component (318) of the electronic device, or combinations thereof. Other operations will be obvious to those of ordinary skill in the art having the benefit of this disclosure.

Figure 5:
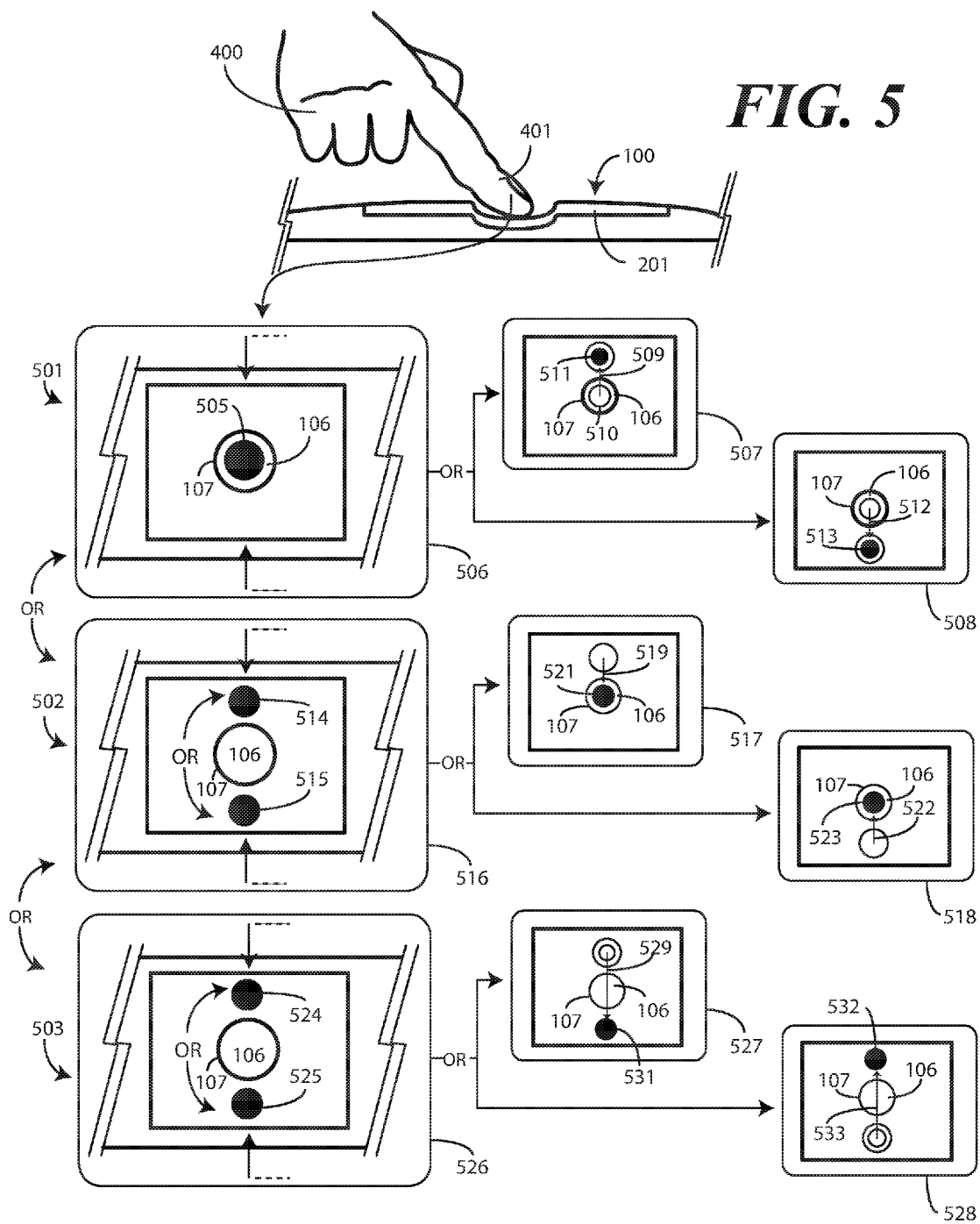
FIG. 5 illustrates explanatory gesture sequences being applied to an explanatory touch sensitive surface configured in accordance with one or more embodiments of the disclosure.

FIG. 5 illustrates examples of various predetermined gesture sequences 501, 502, 503 that a control circuit (315) may be configured to detect in accordance with embodiments of the disclosure. The various predetermined gesture sequences 501, 502, 503 depicted in FIG. 5 are illustrative only, because numerous other predetermined gesture sequences will be obvious to those of ordinary skill in the art having the benefit of this disclosure.

Beginning with predetermined gesture sequence 501, touch actuation begins within the perimeter 107 of the recessed surface feature 106 when the user 400 places a finger 401 into the recessed surface feature 106. This is indicated by a colored dot 505 in FIG. 5 shown at step 506.

From this step 506, the user 400 can deliver the predetermined gesture sequence 501 by moving the finger 401 across the perimeter 107 of the recessed surface feature 106 to traverse the perimeter 107. Illustrating by example, at step 507, the user's finger 401 has moved 509 upward across the perimeter 107 of the recessed surface feature 106 and out of the recessed surface feature 106 to terminate the predetermined gesture sequence 501 at colored dot 511 on a portion of the touch sensitive surface 100 that is complementary to the recessed surface feature 106. The fact that the finger 401 initiated the predetermined gesture sequence 501 within the perimeter 107 of the recessed surface feature 106, but finished elsewhere is indicated by the white circle 510 at step 507 of FIG. 5. The fact that the predetermined gesture sequence 501 terminated the predetermined gesture sequence 501 with the finger 401 outside the perimeter 107 is indicated by the arrow representing the move 509 terminating at colored dot 511.

As used herein to describe the various predetermined gesture sequences 501, 502, 503, colored dots without arrows indicating movement demonstrate the beginning of a touch actuation. White circles at the back of an arrow indicating movement illustrate where a finger or stylus was at the beginning of a touch actuation, but is no longer. Colored dots at the end of arrows demonstrate where a finger or stylus is located at the termination of a predetermined gesture sequence.

As an alternative to step 507, from step 506 the user 400 could similarly move 512 the finger 401 downward across the perimeter 107 of the recessed surface feature 106 at step 508 and out of the recessed surface feature 106 to terminate the predetermined gesture sequence 501 at colored dot 513 on another portion of the touch sensitive surface 100 that is complementary to the recessed surface feature 106. Accordingly, predetermined gesture sequence 501 begins within the perimeter 107 of the recessed surface feature 106 at step 506, but terminates outside the perimeter 107 of the recessed surface feature 106 at either step 507 or step 508. Note that while step 507 and step 508 of this illustration depict movement 509, 512 above and below the recessed surface feature, respectively, the movement could have been up and down as well.

Predetermined gesture sequence 501 is useful, for example, for controlling the volume output of an electronic device. For example, in one embodiment, by initiating the predetermined gesture sequence 501 by placing a finger 401 inside the perimeter 107 of the recessed surface feature 106, the control circuit (315) operable with the touch sensor 201 may be alerted to the fact that a predetermined gesture sequence is being made, rather than an arbitrary touch input. In one embodiment, the predetermined gesture sequence 501 can correspond to an operation like volume adjustment. Thus, when a finger 401 is detected within the perimeter 107 of the recessed surface feature 106, the control circuit (315) can be prompted to expect a volume adjustment input. When the user 400 transitions from step 506 to step 507, the control circuit (315) can detect this to be an "increase volume" input. By contrast, when the user 400 transitions from step 506 to 508, the control circuit (315) can detect this to be a "decrease volume" input, and so forth.

As noted above, volume adjustment is but one example of an operation that can correspond to the predetermined gesture sequence 501. Other operations can include one of a haptic feedback operation, a panning operation, a zooming operation, or combinations thereof. Using a zooming operation as an example, when a finger 401 is detected within the perimeter 107 of the recessed surface feature 106, in another embodiment the control circuit (315) can be prompted to expect a zoom adjustment input. When the user 400 transitions from step 506 to step 507, the control circuit (315) can detect this to be a "zoom in" input, and can accordingly zoom into a picture or image being presented on the display. By contrast, when the user 400 transitions from step 506 to 508, the control circuit (315) can detect this to be a "zoom out" input, and can accordingly zoom out of a picture or image being presented on the display.

In one or more embodiments, a temporal component can be added to the predetermined gesture sequences. For example, in one embodiment, to constitute an identifiable predetermined gesture sequence, the sequence must include a touch actuation remaining within the perimeter 107 of the recessed surface feature 106 for at least a predetermined duration. Thus, using predetermined gesture sequence 501 as an example, in one embodiment at step 506 the user's finger 401 must remain within the perimeter 107 of the recessed surface feature 106, i.e., at colored dot 505, for at least a predetermined duration prior to traversing the perimeter 107 in step 507 or step 508. This predetermined threshold, which may be on the order of several tenths of a second, can provide a "get ready" signal to the control circuit (315), while the movement occurring in subsequent steps provides the "take action" signal necessary to cause the control circuit (315) to execute the operation corresponding to the predetermined gesture sequence 501 in response to detecting the predetermined gesture sequence 501.

Illustrating how this temporal embodiment can used, consider a user desiring to adjust the volume of an electronic device. By placing a finger or stylus within the perimeter 107 of the recessed surface feature 106 for a predetermined duration, this can activate the volume control of the electronic device. The direction with which the user moves the finger or stylus across the perimeter 107 of the recessed surface feature 106 can then determine how the volume is to be adjusted. Moving the finger or stylus up may increase volume, while moving the finger or stylus down may decrease volume and so forth. Additional modes can be added as well. For example, moving the finger or stylus right or left may adjust treble settings while moving the finger diagonally may adjust bass and balance.

In other embodiments, to constitute an identifiable predetermined gesture sequence, the sequence may need to include a touch actuation occurring outside the perimeter 107 of the recessed surface feature 106 for at least a predetermined duration. Again using predetermined gesture sequence 501 as an example, in one embodiment at step 507 or step 508, the user's finger 401 must remain outside the perimeter 107 of the recessed surface feature 106, e.g., at colored dot 511 or colored dot 513, for at least a predetermined duration after to traversing the perimeter 107 of the recessed surface feature 106. In one embodiment, the amount of time the user's finger 401 is outside the perimeter 107 can correspond to an amount of adjustment. Illustrating by example, the duration one holds the user's finger 401 against the touch sensitive surface 100 outside the perimeter 107 can correspond to an amount of volume adjustment, with longer times corresponding to greater adjustment.

Predetermined gesture sequence 502 is a corollary to predetermined gesture sequence 501. Rather than beginning inside the perimeter 107 of the recessed surface feature 106, the touch input of predetermined gesture sequence 502 begins outside of the perimeter 107 of the recessed surface feature 106 and terminates inside the perimeter 107 of the recessed surface feature 106.

More specifically, at predetermined gesture sequence 502 the touch actuation begins outside the perimeter 107 of the recessed surface feature 106 when the user 400 places a finger 401 along an area of the touch sensitive surface 100 that is complementary to the recessed surface feature 106. Two explanatory locations are indicated by colored dot 514 and colored dot 515 shown at step 516.

From this step 516, the user 400 can deliver the predetermined gesture sequence 502 by moving the finger 401 across the perimeter 107 of the recessed surface feature 106 to traverse the perimeter 107 into the recessed surface feature 106. Illustrating by example, at step 517, the user's finger 401 has moved 519 downward across the perimeter 107 of the recessed surface feature 106 and into the recessed surface feature 106 to terminate the predetermined gesture sequence 502 at colored dot 521.

As an alternative to step 517, from step 516 the user 400 could similarly move 522 the finger 401 upward across the perimeter 107 of the recessed surface feature 106 at step 518 into the recessed surface feature 106 to terminate the predetermined gesture sequence 501 at colored dot 523. Accordingly, this predetermined gesture sequence 502 begins outside the perimeter 107 of the recessed surface feature 106 at step 516, but terminates inside the perimeter 107 of the recessed surface feature 106 at either step 517 or step 518. As with predetermined gesture sequence 501, predetermined gesture sequence 502 can be used to control volume, panning, selection of items in a list, scrolling, zooming, or other operations. Additionally, the control circuit (315) can be configured to deliver haptic feedback when predetermined gesture sequence 502 is detected.

As with predetermined gesture sequence 501, predetermined gesture sequence 502 can include a temporal component. For example, in one embodiment, to constitute an identifiable predetermined gesture sequence, the sequence must include a touch actuation remaining within the perimeter 107 of the recessed surface feature 106 for at least a predetermined duration. Thus, as an example, in one embodiment at step 517 or step 518 the user's finger 401 must remain within the perimeter 107 of the recessed surface feature 106, i.e., at colored dot 521 or colored dot 523, for at least a predetermined duration after traversing the perimeter 107 in step 517 or step 518.

In other embodiments, to constitute an identifiable predetermined gesture sequence, the sequence may need to include a touch actuation occurring outside the perimeter 107 of the recessed surface feature 106 for at least a predetermined duration. As another example, in one embodiment at step 516, the user's finger 401 must remain outside the perimeter 107 of the recessed surface feature 106, e.g., at colored dot 514 or colored dot 515, for at least a predetermined duration prior traversing the perimeter 107 of the recessed surface feature 106 at either step 517 or step 518.

Predetermined gesture sequence 503 is just one additional example of the myriad of predetermined gesture sequences that can be detected using interaction with the recessed surface feature 106. In predetermined gesture sequence 503, the user's finger 401 passes through the perimeter 107 of the recessed surface feature 106 as it moves from one side to the other. The touch input of predetermined gesture sequence 503 begins outside of the perimeter 107 of the recessed surface feature 106 and also terminates outside the perimeter 107 of the recessed surface feature 106 having traversed across the perimeter 107 twice.

At predetermined gesture sequence 503 the touch actuation begins outside the perimeter 107 of the recessed surface feature 106 when the user 400 places their finger 401 along an area of the touch sensitive surface 100 that is complementary to the recessed surface feature 106. Two explanatory locations are indicated by colored dot 524 and colored dot 525 shown at step 526.

From this step 526, the user 400 can deliver the predetermined gesture sequence 503 by moving the finger 401 across the perimeter 107 of the recessed surface feature 106 to traverse the perimeter 107 twice. Illustrating by example, at step 527, the user's finger 401 has moved 529 downward across the perimeter 107 of the recessed surface feature 106 and into the recessed surface feature 106, then back out again, to terminate the predetermined gesture sequence 503 at colored dot 531. As an alternative to step 527, from step 526 the user 400 could similarly move 533 the finger 401 upward across the perimeter 107 of the recessed surface feature 106 at step 528 into the recessed surface feature 106, then back out again, to terminate the predetermined gesture sequence 503 at colored dot 532.

As with predetermined gesture sequence 501 and predetermined gesture sequence 502, predetermined gesture sequence 503 can be used to control volume, panning, selection of items in a list, scrolling, zooming, or other operations. Additionally, the control circuit (315) can be configured to deliver haptic feedback when predetermined gesture sequence 503 is detected. Also as with predetermined gesture sequence 501 and predetermined gesture sequence 502, predetermined gesture sequence 503 can include a temporal component. For example, to constitute an identifiable predetermined gesture sequence, the sequence may be required to include a touch actuation remaining within the perimeter 107, and/or outside the perimeter 107 for at least a predetermined time duration.

Figure 6:
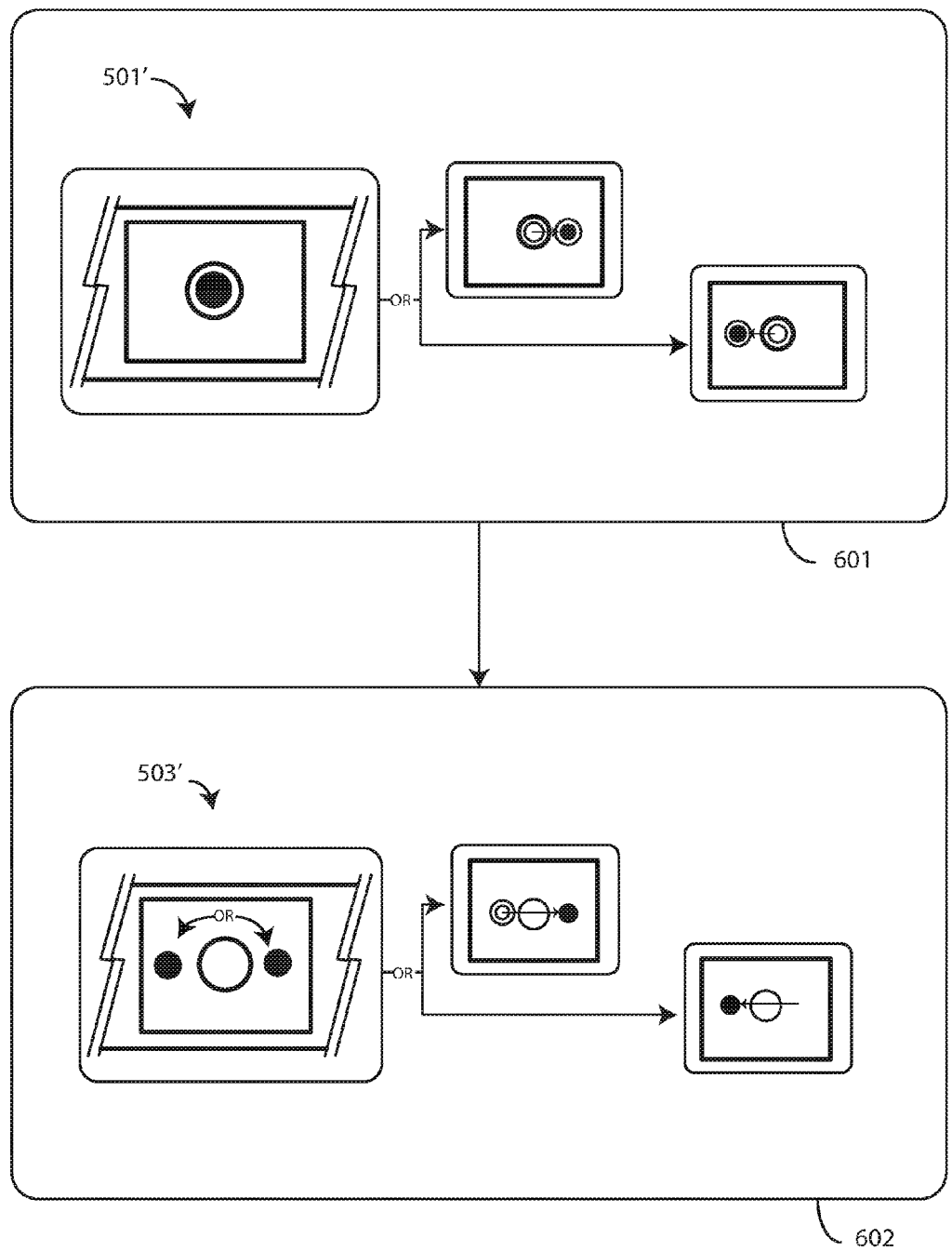
FIG. 6 illustrates one explanatory method of controlling an electronic device in accordance with one or more embodiments of the disclosure.

In one or more embodiments, predetermined gesture sequences can be performed in series to provide more complex user input options. Accordingly, the control circuit (315) can be configured to detect a second predetermined gesture sequence after detecting a first predetermined gesture sequence. In one embodiment, the second predetermined gesture sequence occurs when another touch actuation interacts with the recessed surface feature 106. The control circuit (315) can be configured to perform an operation after the first predetermined gesture sequence, the second predetermined gesture sequence, or both. FIG. 6 illustrates one example of this.

At step 601, predetermined gesture sequence 501' is performed. Note that predetermined gesture sequence 501' is similar in operation to predetermined gesture sequence (501) described above with reference to FIG. 5. However, rather than moving the finger (401) up and down as in predetermined gesture sequence (501), the finger (401) moves left and right in predetermined gesture sequence 501'. At step 602, predetermined gesture sequence 503' is performed.

Note that predetermined gesture sequence 503' is similar in operation to predetermined gesture sequence (503) described above with reference to FIG. 5. However, rather than moving the finger (401) up and down as in predetermined gesture sequence (503), the finger (401) moves left and right in predetermined gesture sequence 503'. The control circuit (315) may be configured to execute a unique operation, in one embodiment, after both steps 601, 602 have been performed. However, in other embodiments, the control circuit (315) can be configured to execute an operation at each step 601, 602. Illustrating by example, after step 601 the control circuit (315) may launch a music player application. The control circuit (315) may then adjust the volume in accordance with the predetermined gesture sequence 503 detected at step 602.

Figure 7:
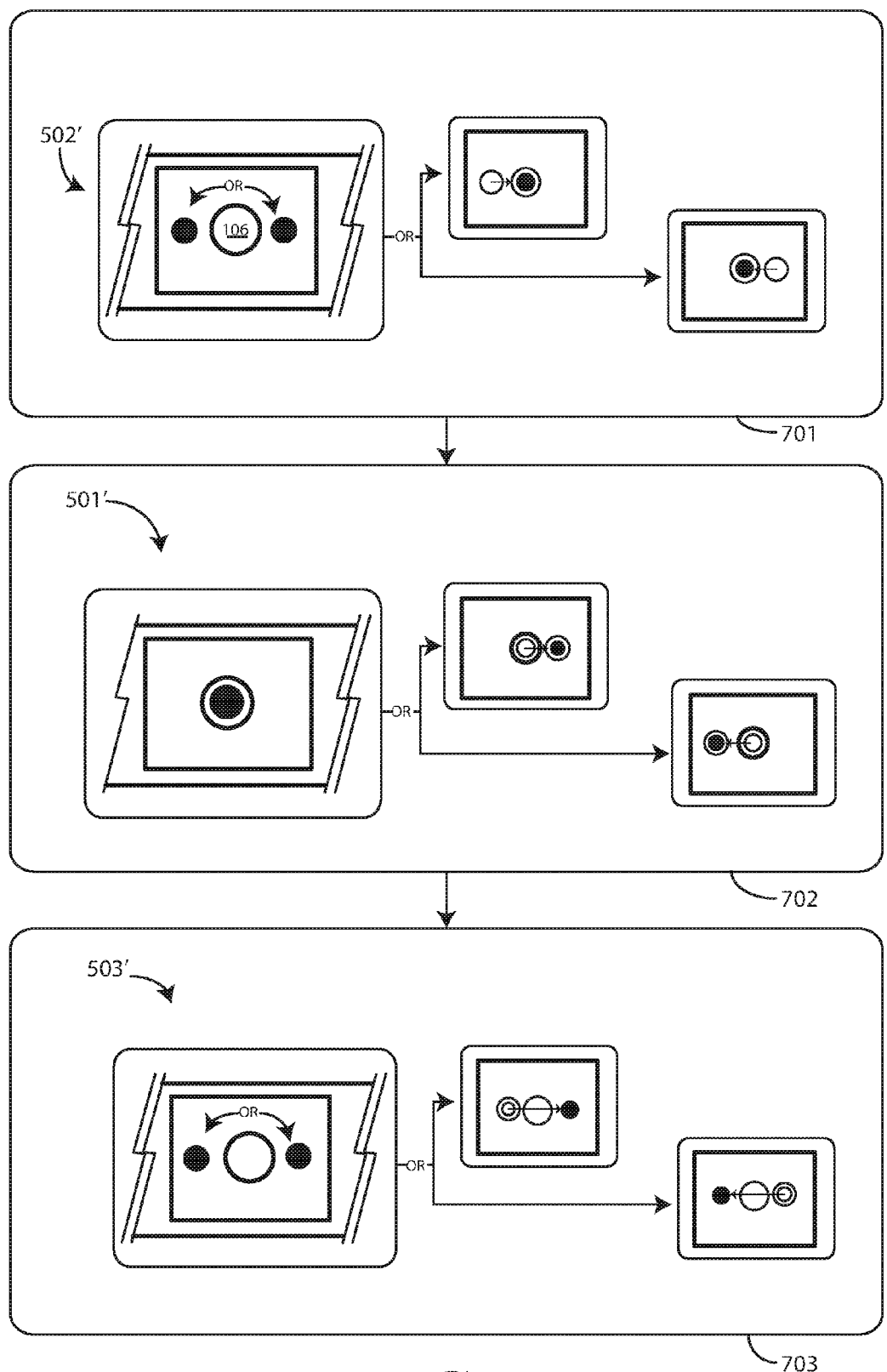
FIG. 7 illustrates another explanatory method of controlling an electronic device in accordance with one or more embodiments of the disclosure.

FIG. 7 provides an illustration of how three or more predetermined gesture sequences can be performed. At step 701, predetermined gesture sequence 502' is detected. Note that predetermined gesture sequence 502' is similar in operation to predetermined gesture sequence (502) described above with reference to FIG. 5. However, rather than moving the finger (401) up and down as in predetermined gesture sequence (502), the finger (401) moves left and right in predetermined gesture sequence 502'. At step 702, predetermined gesture sequence 501 is performed. At step 703, predetermined gesture sequence 503' is performed. It will be obvious to those of ordinary skill in the art having the benefit of this disclosure that other combinations of gesture sequences can be strung together as user input as well.

Figure 8:
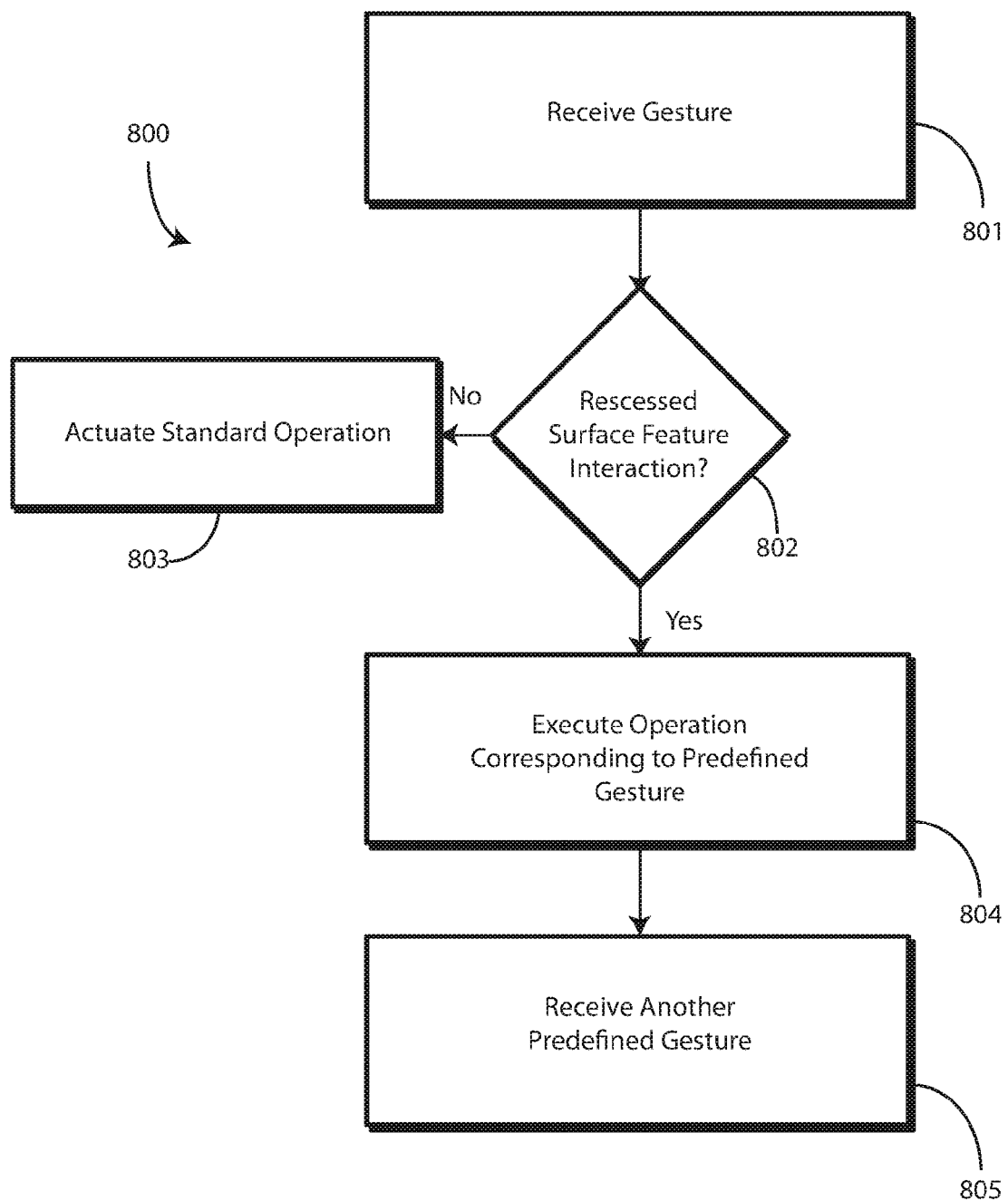
FIG. 8 illustrates yet anther explanatory method of controlling an electronic device in accordance with one or more embodiments of the disclosure.

FIG. 8 illustrates a method 800 of controlling an electronic device in accordance with one or more embodiments of the disclosure. Many of the method steps have previously been described. FIG. 8 provides a concise flow chart of some of the method steps. The flow chart of FIG. 8 is suitable for coding as executable code to control one or more processors or control circuits to execute the method 800.

At step 801, a gesture is received. In one embodiment, the predefined gesture is received from a touch sensitive surface including a concave surface element on a portion of the touch sensitive surface. In one embodiment, the predefined gesture is received when a touch actuation interacts with the concave surface element. Decision 802 determines whether the gesture is a predefined gesture that interacts with the concave surface element, or whether the gesture is an ordinary gesture that does not interact with the concave surface element.

For example, decision 802 can include determining that the touch actuation traverses a perimeter of the concave surface element. In one embodiment, decision 802 can include determining that the touch actuation begins or ends within a perimeter of the concave surface element for at least a predetermined duration. In one embodiment, decision 802 can include determining that the touch actuation begins or ends outside a perimeter of the concave surface element for at least a predetermined duration.

Where the gesture is an ordinary gesture, as determined at decision 802, a corresponding operation can be executed at step 803. However, where the gesture is a predefined gesture that interacts with the concave surface feature, an operation corresponding to the predefined gesture is executed at step 804. In one embodiment the operation is to control the electronic device. Examples of operations include increasing or decreasing a volume output of the electronic device, panning through data presented on a display of the electronic device, performing a zoom operation on the data presented on the display of the electronic device, delivering a haptic response, or combinations thereof.

At optional step 805, another predefined gesture can be received when another touch actuation again interacts with the concave surface element. As described above with reference to FIGS. 6 and 7, step 805 can be repeated to concatenate more and more predefined gestures to create a longer gesture.

It should be observed that the embodiments reside primarily in combinations of method steps and apparatus components related to providing a touch sensitive surface for an electronic device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of detecting touch activation with a capacitive touchpad or other touch sensor as described herein. The non-processor circuits may include, but are not limited to, a radio receiver, a radio transmitter, signal drivers, clock circuits, power source circuits, and user input devices. As such, these functions may be interpreted as steps of a method to perform touch sensing or touch activation operations. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure have been described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion.

For example, talking about a device (10) while discussing figure A would refer to an element, 10, shown in figure other than figure A.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or are not to be construed as a critical, required, or essential features or elements of any or all the claims.

What is claimed is:

1. An electronic device comprising:
a housing;
a display;
a touch-sensitive surface on a side of the housing opposite the display, wherein the touch-sensitive surface includes a recessed feature on a portion of the touch-sensitive surface; and
a control circuit operable to:
detect an object in contact with the touch-sensitive surface;
responsive to determining that the object traversed a perimeter of the recessed feature in a first direction and then remained outside the perimeter of the recessed surface feature for at least a first amount of time, adjust a control of the electronic device based at least in part on the first amount of time; and
responsive to determining that the object traversed the perimeter of the recessed feature in a second direction and then remained outside the perimeter of the recessed surface feature for at least a second amount of time, adjust the control of the electronic device based at least in part on the second amount of time.

2. The electronic device of claim 1, wherein the first direction is opposite the second direction.

3. The electronic device of claim 2, wherein:
the first direction and the second direction are substantially vertical directions; or
the first direction and the second direction are substantially horizontal directions.

4. The electronic device of claim 2, wherein the control is a first control and the control circuit is further operable to:
responsive to determining that the object traversed the perimeter of the recessed feature in a third direction and then remained outside the perimeter of the recessed surface feature for at least a third amount of time, adjust a second control of the electronic device based at least in part on the third amount of time; and
responsive to determining that the object traversed the perimeter of the recessed feature in a fourth direction and then remained outside the perimeter of the recessed surface feature for at least a fourth amount of time, adjust the second control of the electronic device based at least in part on the fourth amount of time.

5. The electronic device of claim 4, wherein:
the third direction is opposite the fourth direction; and
the first direction and the second direction are perpendicular to the third direction and the fourth direction.

6. The electronic device of claim 5, wherein:
the first and second directions are vertical directions and the third and fourth directions are horizontal directions; or
the first and second directions are horizontal directions and the third and fourth directions are vertical directions.

7. The electronic device of claim 1, wherein the control circuit is further operable to adjust the control of the electronic device based on at least one of the first direction or the second direction.

8. A method comprising:
detecting, by a control circuit of an electronic device, at a touch sensitive surface of the electronic device, an object, wherein:
the touch sensitive surface is on a side of a housing of the electronic device that is opposite a display; and
the touch sensitive surface includes a recessed feature on a portion of the touch sensitive surface;
responsive to determining that the object traversed the perimeter of the recessed feature in a first direction and then remained outside the perimeter of the recessed surface feature for at least a first amount of time, adjusting, by the control circuit, a control of the electronic device based at least in part on the first amount of time; and
responsive to determining that the object traversed the perimeter of the recessed feature in a second direction and then remained outside the perimeter of the recessed surface feature for at least a second amount of time, adjusting, by the control circuit, the adjustable control of the electronic device based at least in part on the second amount of time.

9. The method of claim 8, wherein the first direction is opposite the second direction.

10. The method of claim 9, wherein:
the first direction and the second direction are vertical directions; or
the first direction and the second direction are horizontal directions.

11. The method of claim 9, wherein the control is a first control, the method further comprising:
responsive to determining that the object traversed the perimeter of the recessed feature in a third direction and then remained outside the perimeter of the recessed surface feature for at least a third amount of time, adjusting, by the control circuit, a second control of the electronic device based at least in part on the third amount of time; and
responsive to determining that the object traversed the perimeter of the recessed feature in a fourth direction and then remained outside the perimeter of the recessed surface feature for at least a fourth amount of time, adjusting, by the control circuit, the second control of the electronic device based at least in part on the fourth amount of time.

12. The method of claim 11, wherein:
the third direction is opposite the fourth direction; and
the first direction and the second direction are perpendicular to the third direction and the fourth direction.

13. The method of claim 12, wherein:
the first and second directions are vertical directions and the third and fourth directions are horizontal directions; or
the first and second directions are horizontal directions and the third and fourth directions are vertical directions.

14. The method of claim 8, wherein the control is:
a volume control of an audio output device of the electronic device;
a tone control of the audio output device;
a panning control of a camera of the electronic device;
a zooming control of the camera; or
a scrolling control of a graphical user interface of the electronic device.

15. A memory comprising instructions that when executed by a control circuit of an electronic device cause the control circuit to:
detect, at a touch sensitive surface of the electronic device, an object, wherein:
the touch sensitive surface is on a side of a housing of the electronic device that is opposite a display; and
the touch sensitive surface includes a recessed feature on a portion of the touch sensitive surface;
responsive to determining that the object traversed the perimeter of the recessed feature in a first direction and then remained outside the perimeter of the recessed surface feature for at least a first amount of time, adjust a control of the electronic device based at least in part on the first amount of time; and
responsive to determining that the object traversed the perimeter of the recessed feature in a second direction and then remained outside the perimeter of the recessed surface feature for at least a second amount of time, remained outside the perimeter of the recessed surface feature for at least a second amount of time, adjust the control of the electronic device based at least in part on the second amount of time.

16. The memory of claim 15, wherein the first direction is opposite the second direction.

17. The memory of claim 16, wherein:
the first direction and the second direction are vertical directions; or
the first direction and the second direction are horizontal directions.

18. The memory of claim 16, wherein the control is a first control and the instructions, when executed, further cause the control circuit to:
responsive to determining that the object traversed the perimeter of the recessed feature in a third direction and then remained outside the perimeter of the recessed surface feature for at least a third amount of time, adjust a second control of the electronic device based at least in part on the third amount of time; and
responsive to determining that the object traversed the perimeter of the recessed feature in a fourth direction and then remained outside the perimeter of the recessed surface feature for at least a fourth amount of time, adjust the second control of the electronic device based at least in part on the fourth amount of time.

19. The memory of claim 18, wherein:
the third direction is opposite the fourth direction and the first direction and the second direction are perpendicular to the third direction and the fourth direction; and
the first and second directions are vertical directions and the third and fourth directions are horizontal directions, or the first and second directions are horizontal directions and the third and fourth directions are vertical directions.

20. The memory of claim 15, wherein the control is:
a volume control of an audio output device of the electronic device;
a tone control of the audio output device;
a panning control of a camera of the electronic device;
a zooming control of the camera; or
a scrolling control of a graphical user interface of the electronic device.

* * * * *